(12) United States Patent
Rodriguez et al.

(10) Patent No.: US 8,700,701 B2
(45) Date of Patent: Apr. 15, 2014

(54) AUTOMATED SOFTWARE SUBSCRIPTION HEALING

(75) Inventors: Jesus M. Rodriguez, Wake Forest, NC (US); Devan Goodwin, Halifax (CA); James Bowes, Dartmouth (CA)

(73) Assignee: Red Hat, Inc., Raleigh, NC (US)

( * ) Notice: Subject to any disclaimer, the term of this patent is extended or adjusted under 35 U.S.C. 154(b) by 84 days.

(21) Appl. No.: 13/479,134

(22) Filed: May 23, 2012

(65) Prior Publication Data

US 2013/0318150 A1 Nov. 28, 2013

(51) Int. Cl.
*G06F 15/16* (2006.01)

(52) U.S. Cl.
USPC ............... 709/203; 709/224; 705/51; 705/59; 726/27

(58) Field of Classification Search
USPC .............. 709/200–203, 217–227; 726/26–29; 705/51, 59, 344
See application file for complete search history.

(56) References Cited

U.S. PATENT DOCUMENTS

| 7,343,297 | B2* | 3/2008 | Bergler et al. | 705/59 |
|---|---|---|---|---|
| 7,613,631 | B2* | 11/2009 | Walker et al. | 705/16 |
| 7,956,848 | B2* | 6/2011 | Chaudhri | 345/173 |
| 8,487,894 | B2* | 7/2013 | Chaudhri | 345/173 |
| 8,564,563 | B2* | 10/2013 | Chaudhri | 345/173 |
| 2002/0194010 | A1* | 12/2002 | Bergler et al. | 705/1 |
| 2007/0130079 | A1* | 6/2007 | Ivanov et al. | 705/59 |
| 2008/0307533 | A1* | 12/2008 | Hanai | 726/30 |
| 2011/0184880 | A1* | 7/2011 | Neumann et al. | 705/344 |
| 2012/0054874 | A1* | 3/2012 | Chaudhri | 726/26 |

* cited by examiner

*Primary Examiner* — Moustafa M Meky
(74) *Attorney, Agent, or Firm* — Lowenstein Sandler LLP (57) ABSTRACT

A client computing system determines whether an entitlement for a product is valid for a first point in time. Upon determining that the entitlement for the product is not valid for the first point in time, the client computing system sends a first entitlement request to an entitlement server. Upon determining that the entitlement for the product is valid for the first point in time, the client computing system determines whether the entitlement for the product is valid for a second point in time. Upon determining that the entitlement for the product is not valid for the second point in time, the client computing system sends a second entitlement request to the entitlement server.

20 Claims, 4 Drawing Sheets

AUTOMATED SOFTWARE SUBSCRIPTION HEALING

TECHNICAL FIELD

Embodiments of the present invention relate to software subscriptions, and more particularly, to automated software subscription healing.

BACKGROUND

A software provider can sell a number of different software and/or service products. For example, a software provider can sell subscriptions to customers for the software and service products. An entity that has purchased a subscription to a product is an owner of the subscription. An owner's use of a subscription can be represented, for example, as an "entitlement." For example, a customer, such as ACME Company, purchases ten 3-year subscriptions to Enterprise Software ABC and thus, ACME Company is an owner of the ten subscriptions. Ten entitlements represent the ten subscriptions. An owner can then assign the ten entitlements, for example, to various systems. When the owner installs the Enterprise Software ABC on a computing system, the computing system is granted one of the ten entitlements.

Once a computing system has been granted an entitlement, the computing system is registered and subscribed to receive software content from the software provider for the duration of the subscription. For example, a computing system granted an entitlement by ACME Company receives software content from Enterprise Software ABC for 3 years if ACME Company purchased ten 3-year subscriptions to Enterprise Software ABC. Once the subscription expires, the entitlement also expires and will no longer be valid, and the computing system will no longer receive software content from the software provider. A user of the computing system will no longer be able to use the software or service once the entitlement has expired, and a break in coverage may be experienced.

Conventional solutions can require a system administrator to determine which computing systems have entitlements that have expired. The system administrator must then manually select subscriptions (if available) to use to grant an entitlement for each computing system with an expired entitlement. Once a subscription has been selected by the system administrator, it can be used as an entitlement for the computing system in order to provide access to the software for the computing system. Using this manual process, a break in coverage can be experienced by a user of the computing system while the system administrator obtains a new entitlement for the computing system. Moreover, having a system administrator manually select subscriptions may be feasible when there are a small number of computing systems. However, the manual selection can be difficult when there are a large number of computing systems.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Embodiments of the invention are directed to a method and system for automated software subscription healing. A software provider can sell a number of different software and/or service products. An entity that has purchased a subscription to a product is an owner of the subscription, and an owner's use of a subscription can be represented as an entitlement. An owner can then assign the entitlements, for example, to various systems. Once a client computing system has been granted an entitlement, the client computing system is registered and subscribed to receive software content from the software provider using the entitlement for the duration of the subscription.

In order to ensure that a client computing system continues to receive software content from the software provider for a product that the client computing system has an entitlement for, the client computing system can determine whether any of its entitlements have expired or are soon going to expire. Once the client computing system has determined whether any of its entitlements are expired or are going to soon expire, the client computing system can request new entitlements for the corresponding products from an entitlement server. The entitlement server can determine if any subscriptions for the product are available for the client computing system, and grant an appropriate entitlement to the client computing system if a subscription does exist. The client computing system can pull down the entitlement and obtain access to the required content. By automatically checking the entitlements for the current point in time and a future point in time, the client computing system minimizes a potential break in receiving software content for the product from a software provider. For example, if the routine runs once a day and the customer has purchased sufficient subscriptions, the client computing system will automatically ensure it has access to updates for the software installed on the client computing system.

Figure 1:
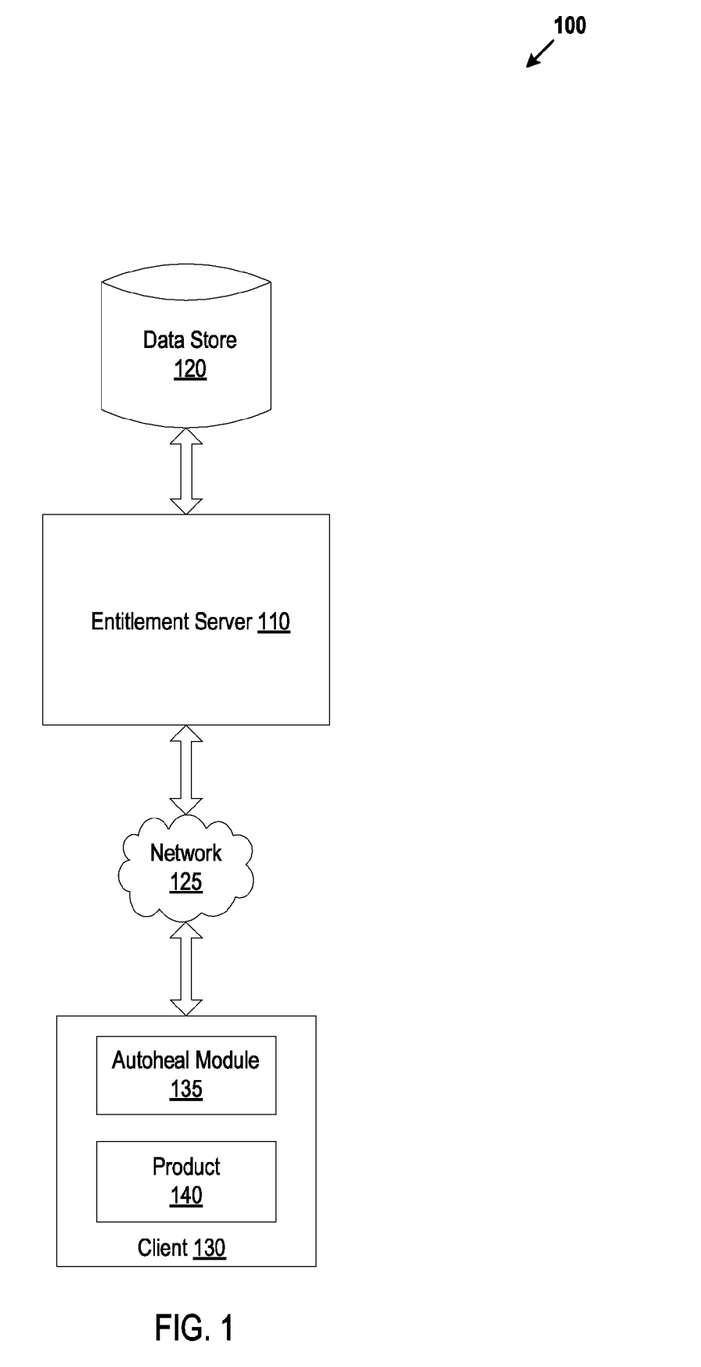
FIG. 1 illustrates exemplary system architecture, in accordance with various embodiments of the present invention.

FIG. 1 illustrates an exemplary network architecture 100 in which embodiments can be implemented. Embodiments of the invention are directed to a method and system for automated software subscription healing. The network architecture 100 can include a server, such as entitlement server 110, communicating with one or more clients 130 via a network 125. Network 125 may be may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

Entitlement server 110 may be a rackmount server, a router computer, a personal computer, a portable digital assistant, a mobile phone, a laptop computer, a tablet computer, a camera, a video camera, a netbook, a desktop computer, a media center, or any combination of the above. In one embodiment, the entitlement server 110 is deployed as a network appliance (e.g., a network router, hub, or managed switch).

Data store 120 is a persistent storage that is capable of storing data that is collected from data sources. Examples of data sources can include, and are not limited to, desktop computers, laptop computers, handheld computers, server computers, gateway computers, mobile communications devices, cell phones, smart phones, or similar computing device. In some embodiments, data store 120 might be a network-attached file server, while in other embodiments administration data store 120 might be some other type of persistent storage such as an object-oriented database, a relational database, and so forth. Data store 120 may be part of the entitlement server 110 or coupled to the entitlement server 110 directly or via a network.

The data in the data store 120 can include data related to automated software subscription healing. Examples of data related to automated software subscription healing can include, and are not limited to, an autoheal flag for each client 130, subscription information for each client 130, etc. The entitlement server 130 may upload subscription information (e.g., new subscriptions, updated subscriptions, etc.) for each client 130 for storage (e.g., in data store 120). The autoheal flag for each client 130 can represent whether that client 130 is entitled to receiving automated software subscription healing.

The one or more clients 130 may be personal computers (PC), laptops, mobile phones, tablet computers, or any other computing devices. The clients 130 may run an operating system (OS) that manages hardware and software of the clients 130. A daemon (not shown) may run on each of the clients (e.g., on the OS of each client machine). The daemon may request an autoheal flag for the client 130 on which it runs from the entitlement server 110. The daemon may further request another entitlement for a product installed on the client 130 from the entitlement server 110.

Software providers can develop and/or sell one or more software products and/or service products. A software provider can be a large software company that develops and sells operating system platforms, an independent software vendor (ISV) that develops and sells specialized software to run on an operating system platform, and/or an independent software provider (ISP) that does not develop, but sells software products and/or service products. For brevity and simplicity, an ISV is used as an example of a software provider throughout this document.

Customers can purchase subscriptions to the software and service products. An entity that has purchased a subscription to a product is an owner of the subscription. A purchase of a subscription is an owner's right to use the product for the period of the subscription. An owner's use of a subscription can be represented, for example, as an "entitlement." Software may or may not already be installed on an entity. Software that is already installed on an entity can be somewhat usable, even if the entity is not granted an entitlement for the installed software. When an entity is granted an entitlement for the software, the entity can access a product repository to allow the entity to receive software updates for the product. For example, an ISV develops and sells a software product called Enterprise Software ABC. A customer, ACME Company, purchases ten 3-year subscriptions to Enterprise Software ABC, which is represented by ten entitlements. ACME Company may already have the Enterprise Software ABC installed in one or more systems. When the one or more systems are granted entitlements for the Enterprise Software ABC, the systems can receive updates for the Enterprise Software ABC for 3 years.

An entity is represented by client 130 and can be a potential consumer or an existing consumer of an entitlement. A consumer is an entity that has been granted an entitlement to allow the entity to consume (use) one or more products and to grant the entity access to one or more product repositories for receiving product updates for the length of the subscription. Examples of entities include, and are not limited to, a person, a client computing system, a server computing system, a domain, etc. For example, when an entity is granted an entitlement for the Enterprise Software ABC, the entity is a consumer of the Enterprise Software ABC for the length of the subscription (e.g., 3 years). An entitlement can expire when the length of the subscription for the entity has ended. Once an entitlement has expired, the entity to which the entitlement was granted no longer has access to the one or more product repositories for receiving product updates.

During operation of system 100, a client 130 (entity) can periodically determine whether the entitlements that have been granted to the client 130 have expired or are going to expire, in order to prevent an interruption in access of the client 130 to the product repositories for receiving product updates.

In one embodiment, client 130 includes an autoheal module 135 and one or more products 140. Client 130 can access an autoheal flag for the client 130 in one or more repositories which are coupled to entitlement server 110 (e.g., data store 120). If the autoheal flag for the client is not set (e.g., value of 0), client 130 may not perform automated software subscription healing. If the autoheal flag for client 130 is set (e.g., has a value of 1), client 130 may perform automated software subscription healing for client 130. In one embodiment, the autoheal flag for client 130 is set by a user of the client 130.

To perform automated software subscription healing for client 130, autoheal module 135 can determine whether there is a valid entitlement for each product 140 installed on client 130 for a current point in time. If a valid entitlement does not exist for each product 140 installed on client 130 for a current point in time, autoheal module 135 can request an entitlement for the current point in time from entitlement server 110. If there is a valid entitlement for each product 140 installed on client 130 for a current point in time, autoheal module 135 can determine whether there is a valid entitlement for each product 140 installed on client 130 for a future point in time (e.g., twenty-four hours from the current point in time). If a valid entitlement does not exist for each product 140 installed on client 130 for a future point in time, autoheal module 135 can request an entitlement for the future point in time from the entitlement server 110.

Upon receiving a request from autoheal module 135 for an entitlement, the entitlement server 110 can determine whether there is a valid subscription in data store 120 for client 130 which can be used to grant an entitlement to client 130. If entitlement server 110 determines that there is a valid subscription in data store 120 for client 130, entitlement server 110 can grant an entitlement to client 130 for the product 140. In one embodiment, entitlement server 110 provides a notification to client 130 that a new entitlement has been granted. Upon receiving a notification from entitlement server 110, client 130 can obtain the new entitlement from entitlement server 110.

Figure 2:
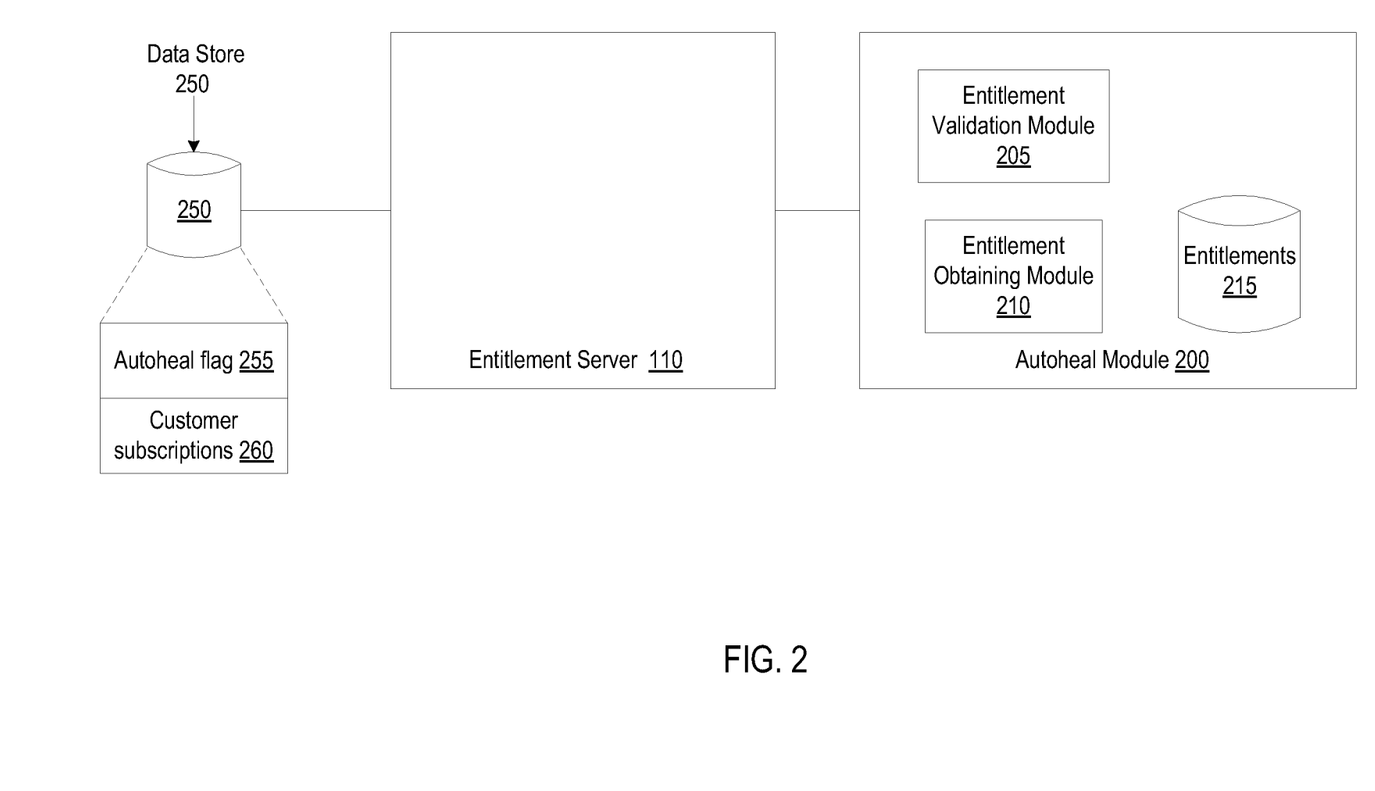
FIG. 2 is a block diagram of an autoheal module and an entitlement determination module, in accordance with an embodiment.

FIG. 2 is a block diagram of an entitlement server 110 and an autoheal module 200, in accordance with one embodiment of the present invention. The autoheal module 200 includes an entitlement validation module 205, an entitlement obtaining module 210, and entitlements 215. Note that in alternative embodiments, the functionality of one or more of the entitlement validation module 205, the entitlement obtaining module 210, and entitlements 215 may be combined or divided.

Entitlement validation module 205 can determine, at a predetermined time, whether autohealing is on. In one embodiment, entitlement validation module 205 makes the determination at a predetermined time of day (e.g., daily at midnight). In an alternate embodiment, entitlement validation module 205 makes the determination in response to a request by a user (e.g., system administrator). In another alternate embodiment, entitlement validation module 205 makes the determination at a predetermined interval (e.g., every twelve hours). In one embodiment, entitlement validation module 205 makes the determination by requesting and receiving the autohealing information from the entitlement server 110. In an alternate embodiment, entitlement validation module 205 determines whether autohealing is on by accessing autoheal flag 255 in data store 250.

Entitlement validation module 205 can determine if installed products (e.g., all installed products) on the client system are covered by valid entitlements for a first point in time. In one embodiment, entitlement validation module 205 determines if the installed products on the client system are covered by valid entitlements for a first point in time by comparing the expiration time for an entitlement for each installed product to the first point in time. In one embodiment, if the first point in time is prior to the expiration time for an entitlement for an installed product, entitlement validation module 205 determines that the entitlement for the installed product is valid. In one embodiment, if the first point in time is after the expiration time for an entitlement for an installed product, entitlement validation module 205 determines that the entitlement is not valid. If installed products on the client system are covered by valid entitlements for a first point in time, entitlement validation module 205 can determine if the installed products on the client system are covered by valid entitlements for a second point in time. In one embodiment, entitlement validation module 205 determines if the installed products on the client system are covered by valid entitlements for a second point in time by comparing the expiration time for an entitlement for each installed product to the second point in time. In one embodiment, if the second point in time is prior to the expiration time for an entitlement for an installed product, entitlement validation module 205 determines that the entitlement for the installed product is valid. In one embodiment, if the second point in time is after the expiration time for an entitlement for an installed product, entitlement validation module 205 determines that the entitlement is not valid.

Entitlement obtaining module 210 can send a request to the entitlement server 110 for an entitlement for each installed product that is not covered by a valid entitlement. In one embodiment, the request includes a product for which an entitlement is requested. In one embodiment, the request includes a time (e.g., first point in time, second point in time, etc.) Entitlement obtaining module 210 can receive a notification of one or more entitlements from the entitlement server and can obtain the one or more entitlements in response to the one or more notifications. In one embodiment, entitlement obtaining module 210 obtains the one or more entitlements by pulling down the entitlement from the entitlement server 110. In an alternate embodiment, entitlement obtaining module 210 obtains the one or more entitlements by receiving the one or more entitlements from the entitlement server 110. In one embodiment, upon obtaining the entitlement from the entitlement server 110, entitlement obtaining module 210 stores the entitlement in entitlements 215. In an alternate embodiment, upon obtaining the entitlement from the entitlement server 110, entitlement obtaining module 210 stores the entitlement in data store 250.

In one embodiment, entitlement obtaining module 210 periodically (e.g., at a predetermined time, every hour, etc.) sends product information including installed products to entitlement server 110 separately from the request for an entitlement. In this embodiment, entitlement obtaining module 210 sends the request to entitlement server 110 including only a time.

Entitlement server 110 can receive a request from autoheal module 200 for an entitlement. In one embodiment, the request includes a product for which an entitlement is requested. In one embodiment, the request includes a time. In one embodiment, entitlement server 110 periodically receives product information separate from the request from entitlement obtaining module 210. Entitlement server 110 can determine if each of the installed products has a valid entitlement, and if each of the installed products does not have a valid entitlement, it can determine an entitlement for the product for the included time (e.g. current point in time, future point in time, etc.). For embodiments of determining an entitlement, reference is made to application Ser. No. 12/969, 437. For example, determining an entitlement can be based on current rules that are independent of product code for one or more products.

Figure 3:
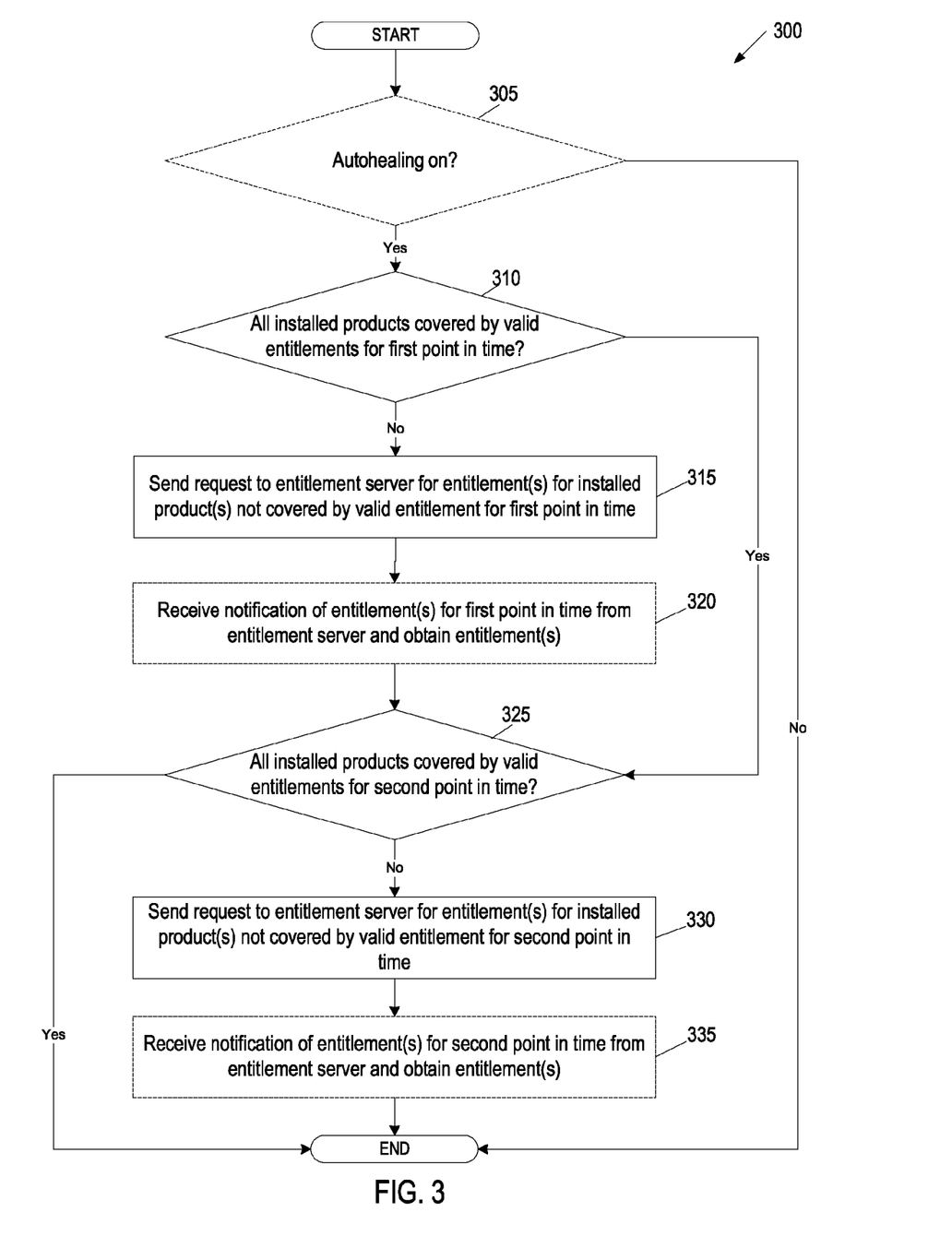
FIG. 3 is a flow diagram illustrating an embodiment for a method of automated software subscription healing, in accordance with an embodiment.

FIG. 3 is a flow diagram of an embodiment of a method 300 for automated software subscription healing on a client system. The method 300 is performed by processing logic that may comprise hardware (circuitry, dedicated logic, etc.), software (such as is run on a general purpose computer system or a dedicated machine), or a combination of both. In one embodiment, the method 300 is performed by the client 130 of FIG. 1. The method 300 may be performed by an autoheal module 135 running on client 130 or another machine.

At optional block 305, processing logic can determine, at a predetermined time, whether autohealing is on for the client system. In one embodiment, processing logic makes the determination at a predetermined time of day (e.g., daily at midnight). In an alternate embodiment, an administrator of the client system requests that the autohealing be performed by turning on autohealing for the client system. In another alternate embodiment, processing logic makes the determination at a predetermined interval (e.g., every twenty four hours).

In one embodiment, autohealing is on if a flag is set for the client system running the processing logic. In one embodiment, processing logic determines whether autohealing is on by sending a request to an entitlement server with identification information for the client system and receiving the autoheal flag from the entitlement server. In this embodiment, processing logic determines that autohealing is on if the flag is set (e.g., value of 1) and that autohealing is off if the flag is not set (e.g., value of 0). In an alternate embodiment, processing logic determines whether autohealing is on by accessing a predetermined portion of a data repository of the entitlement server (e.g., the portion where the autoheal flag is stored for the client system) and reading the predetermined portion. If the autoheal is not on, the method 300 ends. If the autoheal is on, the method 300 continues to block 310.

At block 310, processing logic determines if installed products on the client system are covered by valid entitlements for a first point in time. In one embodiment, the first point in time is a current point in time. In an alternate embodiment, the first point in time is a future point in time. In another alternate embodiment, the first point in time is a previous point in time. In one embodiment, processing logic determines if the installed products on the client system are covered by valid entitlements for a first point in time by comparing the expiration time for an entitlement for each installed product to the first point in time. In one embodiment, if the first point in time is prior to the expiration time for an entitlement for an installed product, the entitlement for the installed product is determined to be valid. In one embodiment, if the first point in time is after the expiration time for an entitlement for an installed product, the entitlement is determined to be not valid because the subscription associated with the entitlement has expired with respect to the first point in time. If the installed products are covered by a valid entitlement for the first point in time, the method 300 proceeds to block 325. If any of the installed products are not covered by a valid entitlement for the first point in time, the method 300 proceeds to block 315.

At block 315, processing logic sends a request to an entitlement server for an entitlement for each installed product that is not covered by a valid entitlement for the first point in time. In one embodiment, the request for an entitlement includes the first point in time such that the entitlement server is aware that the entitlement must be granted using a subscription that is valid for the first point in time.

At optional block 320, processing logic receives a notification of one or more entitlements for the first point in time from the entitlement server and obtains the one or more entitlements in response to the one or more notifications. In one embodiment, a notification is received for each entitlement request to which the entitlement server was able to grant an entitlement. In an alternate embodiment, a notification is received for all entitlement requests and includes information about whether or not an entitlement was granted for the request. In one embodiment, processing logic obtains the one or more entitlements by pulling down the entitlement from the entitlement server, thus granting access to content associated with product which had an expired entitlement. In an alternate embodiment, processing logic obtains the one or more entitlements by receiving the one or more entitlements from the entitlement server.

At block 325, processing logic determines if all installed products on the client system are covered by valid entitlements for a second point in time. In one embodiment, the second point in time is a future point in time. In an alternate embodiment, the second point in time is a current point in time. In another alternate embodiment, the second point in time is a previous point in time. In one embodiment, the second point in time is related to the first point in time (e.g., twenty four hours after the first point in time, etc.). In one embodiment, processing logic determines if all installed products on the client system are covered by valid entitlements for the second point in time by comparing the expiration time for an entitlement for each installed product to the second point in time. In one embodiment, if the second point in time is prior to the expiration time for an entitlement for an installed product, the entitlement for the installed product is determined to be valid. In one embodiment, if the second point in time is after the expiration time for an entitlement for an installed product, the entitlement is determined to be not valid for the second point in time because the subscription associated with the entitlement has expired with respect to the second point in time. If all installed products are covered by a valid entitlement for the second point in time, the method 300 ends. If all installed products are not covered by a valid entitlement for the second point in time, the method 300 proceeds to block 330.

At block 330, processing logic sends a request to an entitlement server for an entitlement for each installed product that is not covered by a valid entitlement for the second point in time. In one embodiment, the request for an entitlement includes the second point in time such that the entitlement server is aware that the entitlement must be granted using a subscription that is valid for the second point in time (e.g., the subscription starts twenty four hours in the future).

At optional block 335, processing logic receives a notification of one or more entitlements for the second point in time from the entitlement server and obtains the one or more entitlements in response to the one or more notifications. In one embodiment, a notification is received for each entitlement request to which the entitlement server was able to grant an entitlement. In an alternate embodiment, a notification is received for all entitlement requests and includes information about whether or not an entitlement was granted for the request. In one embodiment, processing logic obtains the one or more entitlements by pulling down the entitlement from the entitlement server, thus granting access to content associated with product which had an expired entitlement. In an alternate embodiment, processing logic obtains the one or more entitlements by receiving the one or more entitlements from the entitlement server.

Figure 4:
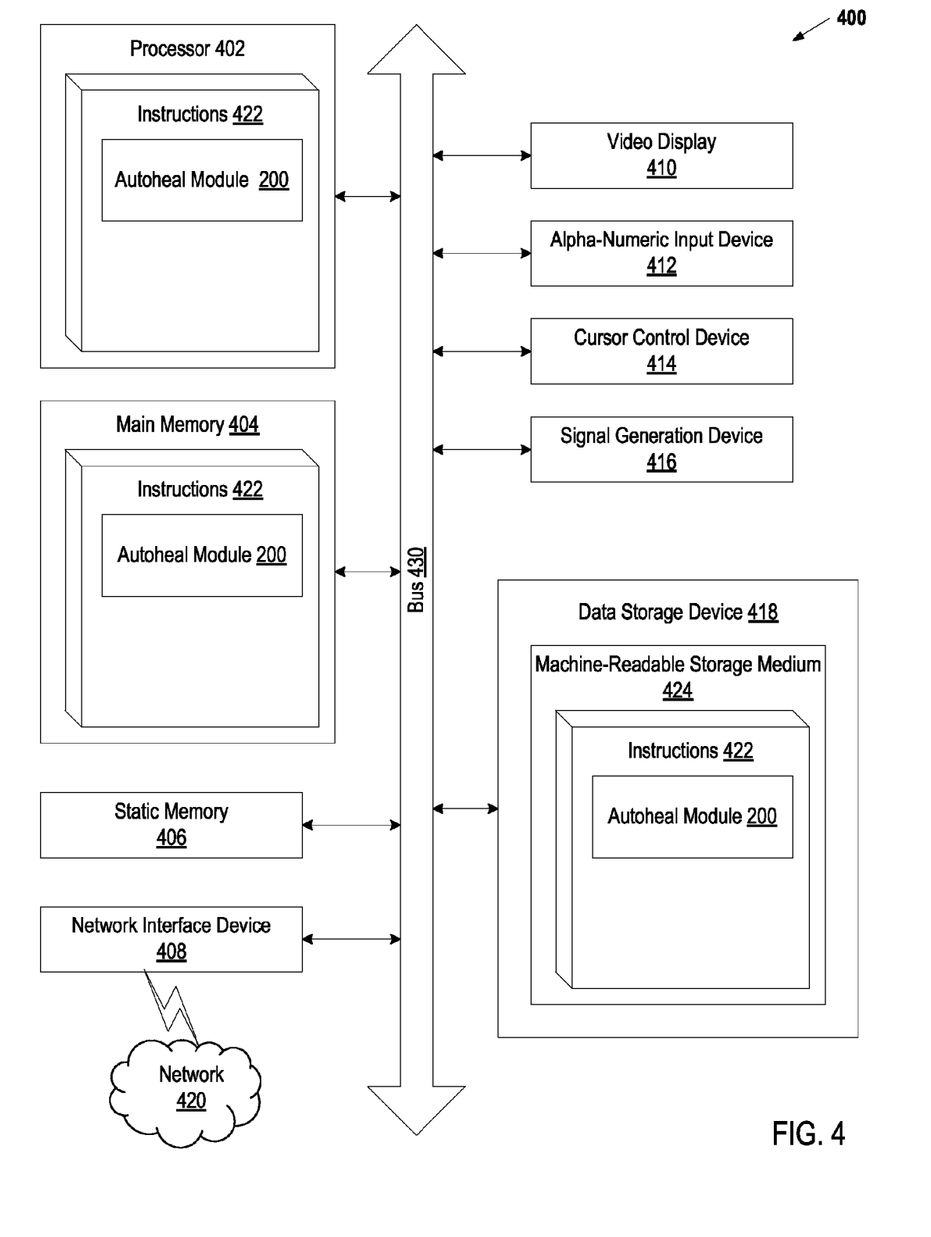
FIG. 4 is a block diagram of an exemplary computer system that may perform one or more of the operations described herein.

FIG. 4 illustrates a diagram of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable storage medium 424 on which is stored one or more sets of instructions 422 (e.g., software) embodying any one or more of the methodologies or functions described herein. The instructions 422 may also reside, completely or at least partially, within the main memory 404 and/or within the processor 402 during execution thereof by the computer system 400, the main memory 404 and the processor 402 also constituting computer-readable storage media. The instructions 422 may further be transmitted or received over a network 420 via the network interface device 408.

In one embodiment, the instructions 422 include instructions for an autoheal module (e.g., autoheal module 200 of FIG. 2) and/or a software library containing methods that call an autoheal module. While the computer-readable storage medium 424 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "presenting", "updating", "determining", "executing," "providing," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a server computing system programmed to perform the following, comprising:
    determining, by a client computing system comprising a processor, whether an entitlement for a product is valid for a first point in time;
    upon determining that the entitlement for the product is not valid for the first point in time, sending, by the client computing system, a first entitlement request to an entitlement server;
    upon determining that the entitlement for the product is valid for the first point in time, determining, by the client computing system, whether the entitlement for the product is valid for a second point in time; and
    upon determining that the entitlement for the product is not valid for the second point in time, sending, by the client computing system, a second entitlement request to the entitlement server.

2. The method of claim 1, wherein the first point in time is a current date and time.

3. The method of claim 1, wherein the second point in time is a date and time that is a predefined time interval from a current date and time.

4. The method of claim 1, wherein the entitlement comprises an expiration time.

5. The method of claim 4, wherein determining whether the entitlement for the product is valid for the first point in time comprises:
    comparing, by the client computing system, the expiration time for the entitlement to the first point in time;
    determining, by the client computing system, that the entitlement for the product is valid if the first point in time is prior to the expiration time; and
    determining, by the client computing system, that the entitlement for the product is not valid if the first point in time is past the expiration time.

6. The method of claim 1, wherein the first entitlement request comprises identification information for the product and the first point in time and the second entitlement request comprises identification information for the product and the second point in time.

7. The method of claim 1, further comprising:
    determining, by the client computing system, whether autohealing is enabled for the client computing system.

8. The method of claim 1, further comprising:
    receiving, by the client computing system, a notification from the entitlement server that another entitlement has been obtained; and obtaining, by the client computing system, the another entitlement from the entitlement server in response to receiving the notification.

9. A system comprising:
a memory; and
a processing device coupled with the memory, the processing device to
determine whether an entitlement for a product is valid for a first point in time;
upon determining that the entitlement for the product is not valid for the first point in time, send a first entitlement request to an entitlement server;
upon determining that the entitlement for the product is valid for the first point in time, determine whether the entitlement for the product is valid for a second point in time; and
upon determining that the entitlement for the product is not valid for the second point in time, send a second entitlement request to the entitlement server.

10. The system of claim 9, wherein the first point in time is a current date and time and the second point in time is a data and time that is twenty four hours from the current date and time.

11. The system of claim 9, wherein the entitlement comprises an expiration time.

12. The system of claim 11, wherein to determine whether the entitlement for the product is valid for the first point in time causes the processing device to:
compare the expiration time for the entitlement to the first point in time;
determine that the entitlement for the product is valid if the first point in time is prior to the expiration time; and
determine that the entitlement for the product is not valid if the first point in time is past the expiration time.

13. The system of claim 9, wherein the first entitlement request comprises identification information for the product and the first point in time and the second entitlement request comprises identification information for the product and the second point in time.

14. The system of claim 9, wherein the processing device is further to:
receive a notification from the entitlement server that another entitlement has been obtained; and
obtain the another entitlement from the entitlement server in response to receiving the notification.

15. A non-transitory computer readable storage medium including instructions that, when executed by a processor, cause the processor to perform a method comprising:
determining whether an entitlement for a product is valid for a first point in time;
upon determining that the entitlement for the product is not valid for the first point in time, sending a first entitlement request to an entitlement server;
upon determining that the entitlement for the product is valid for the first point in time, determining whether the entitlement for the product is valid for a second point in time; and
upon determining that the entitlement for the product is not valid for the second point in time, sending a second entitlement request to the entitlement server.

16. The non-transitory computer readable storage medium of claim 15, wherein the first point in time is a current date and time and the second point in time is a date and time that is twenty four hours from the current date and time.

17. The non-transitory computer readable storage medium of claim 15, wherein the entitlement comprises an expiration time.

18. The non-transitory computer readable storage medium of claim 17, wherein determining whether the entitlement for the product is valid for the first point in time comprises:
comparing the expiration time for the entitlement to the first point in time;
determining that the entitlement for the product is valid if the first point in time is prior to the expiration time; and
determining that the entitlement for the product is not valid if the first point in time is past the expiration time.

19. The non-transitory computer readable storage medium of claim 15, wherein the first entitlement request comprises identification information for the product and the first point in time and the second entitlement request comprises identification information for the product and the second point in time.

20. The non-transitory computer readable storage medium of claim 15, wherein the method further comprises:
receiving a notification from the entitlement server that another entitlement has been obtained; and
obtaining the another entitlement from the entitlement server in response to receiving the notification.

* * * * *